M. HIPES.
DISH WASHING MACHINE.
APPLICATION FILED AUG. 29, 1918.

1,347,698.

Patented July 27, 1920.

INVENTOR.
Margaret Hipes.
BY
Hazard & Miller
ATTORNEYS.

UNITED STATES PATENT OFFICE.

MARGARET HIPES, OF SANTA BARBARA, CALIFORNIA.

DISH-WASHING MACHINE.

1,347,698.                 Specification of Letters Patent.       Patented July 27, 1920.

Application filed August 29, 1918. Serial No. 251,970.

*To all whom it may concern:*

Be it known that I, Mrs. MARGARET HIPES, a citizen of the United States, residing at Santa Barbara, in the county of Santa Barbara and State of California, have invented new and useful Improvements in Dish-Washing Machines, of which the following is a specification.

My invention relates to dish washing machines, and consists of the novel features herein shown, described and claimed.

Figure 1:
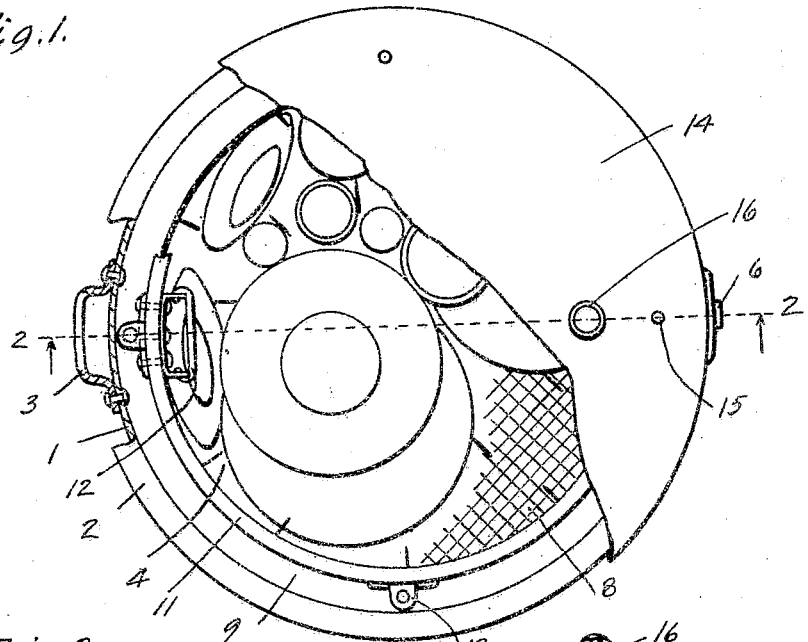
Figure 1 is a top plan view of a dish washing machine embodying the principles of my invention, parts being broken away and shown in section.
Figure 2:
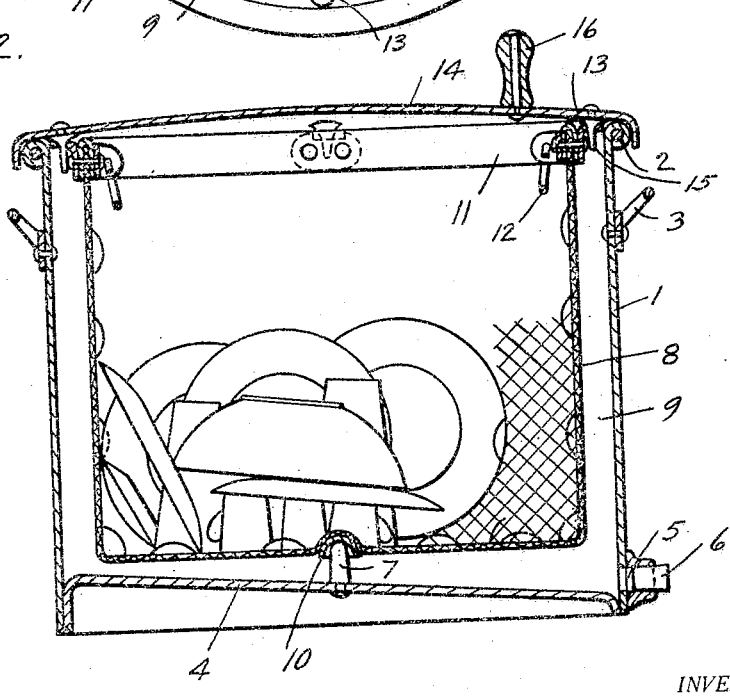
Fig. 2 is a vertical central section on the line 2—2 of Fig. 1.

The tank comprises a straight vertical annular wall 1 formed of imperforate sheet metal, and having a wired upper edge 2. The lifting handles 3 are secured to the wall 1 near its top. The inclined bottom 4 is inserted upwardly and secured to the annular wall 1, there being a drain opening 5 through the wall 1 at the lowest point of the bottom 4 and a cork 6 for closing the drain opening. A stud 7 extends upwardly at the axial center of the bottom 4. A foraminous basket 8 fits loosely in the chamber 9 of the tank, and has a bearing 10 resting upon the point of the stud 7 to hold the basket clear of the bottom 4. The upper edge of the basket 8 is provided with a stiff rim 11, and handles 12 are secured to the inner face of the rim diametrically opposite each other for lifting the basket. Ears 13 project outwardly from the rim 11, there being preferably four ears equally spaced around the basket. The cover 14 fits loosely around the wired edge 2 and has teeth 15 extending downwardly through the ears 13, and a handle 16 projects upwardly from the cover eccentric of the center, so as to serve as a crank.

The dishes to be washed are placed in the basket 8. The basket is placed in position in the tank 1, hot water is poured upon the dishes, then the cover 14 is applied, and the handle 10 grasped and turned like a crank back and forth to rotate or oscillate the basket 8 upon the stud 7. Then the cover 14 may be removed and handles 12 grasped and the basket 8 containing the dishes lifted from the tank and inserted into another tank for rinsing.

Various changes may be made without departing from the spirit of my invention as claimed.

I claim:

A dish washer comprising a tank having an open upper end, a basket in said tank spaced from the wall thereof, a central bearing at the bottom of said basket for supporting the entire weight of the latter, ears projecting outwardly from the upper edge of said basket with their outer ends in sliding contact with the tank wall, a cover having a depending flange loosely surrounding the upper end of said tank wall, a handle for turning said cover, and teeth depending from said cover and engaging said ears to turn the basket; the contact of said ears with the casing wall serving to prevent tilting of the basket whenever the cover is removed, thereby facilitating engagement of said teeth with the ears when the cover is to be replaced.

In testimony whereof I have signed my name to this specification.

Mrs. MARGARET HIPES.